917X
J. Bolton,
Churn.
Patented Aug. 2. 1808.
NO PRINTED COPY OF SPECIFICATION IN OFFICE.
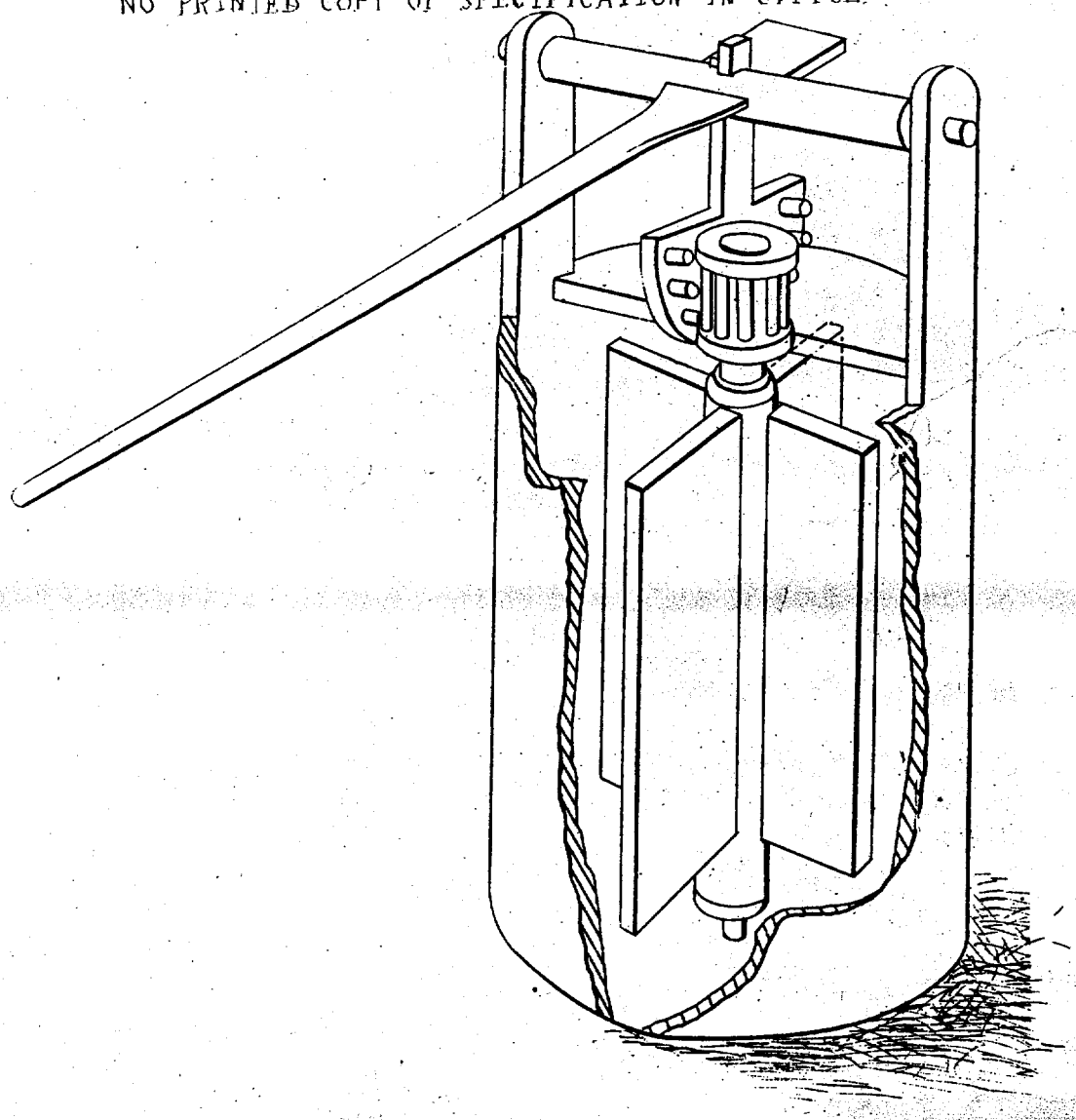

John Bolton 917X

Aug 2, 1808

Letters Patent. Issued Aug. 2. 1808.

The schedule referred to in these Letters Patent and making part of the same
containing a description in the words of the said John Bolton himself of his
Churn.
The Churning machine is to be worked by a lever the lever to play in a roller
and in the roller is a stud eight inches in length and on the lower end of the
a semi or quarter circle on which are to be prepared cogs on the face, and the
cogs on the semi or quarter circle to mesh into a trundel head on the top of a
wheel or dasher which dasher works in the body of the churn which churn may
be either round or square — the same lever may be applied to a slider which
is cogged on the face similar to the above mentioned circle and can operate on two
wheels or one as the case may require — These wheels are to stand in a perpendicular
form and may be fixed with arms to project through the shaft of the wheel
and on the end of these arms are to be fixed slats in a perpendicular form, like
the shaft.

(Signd) John Bolton

Witnesses
(Signd) William Thornton
(Signd) George Andrews

Exd.
C.J.W.

210 [illegible]

[illegible]